(12) United States Patent
Kobayashi et al.

(10) Patent No.: US 7,257,674 B2
(45) Date of Patent: Aug. 14, 2007

(54) RAID OVERLAPPING

(75) Inventors: Seiji Kobayashi, Kanagawa-ken (JP); Toshiyuki Sanuki, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 10/872,059

(22) Filed: Jun. 18, 2004

(65) Prior Publication Data
US 2004/0268019 A1 Dec. 30, 2004

(30) Foreign Application Priority Data
Jun. 24, 2003 (JP) .............................. 2003-179042

(51) Int. Cl.
*G06F 12/16* (2006.01)
(52) U.S. Cl. ..................... 711/114; 711/1; 711/147; 711/148; 711/154; 711/162; 709/201; 709/203; 709/220
(58) Field of Classification Search ................ 711/114, 711/1, 147, 148, 154, 162; 714/6; 709/201, 709/203, 220
See application file for complete search history.

(56) References Cited

U.S. PATENT DOCUMENTS 6,785,836 B2 * 8/2004 Franklin et al. ............... 714/6

| | | | | |
|---|---|---|---|---|
| 2003/0023811 A1 * | 1/2003 | Kim et al. | .......... | 711/114 |
| 2003/0046497 A1 * | 3/2003 | Dandrea | .......... | 711/154 |
| 2003/0105920 A1 * | 6/2003 | Rodriguez et al. | .......... | 711/114 |
| 2003/0149750 A1 * | 8/2003 | Franzenburg | .......... | 709/220 |
| 2003/0225970 A1 * | 12/2003 | Hashemi | .......... | 711/114 |
| 2004/0015655 A1 * | 1/2004 | Willis et al. | .......... | 711/114 |
| 2004/0250161 A1 * | 12/2004 | Patterson | .......... | 714/6 |

\* cited by examiner

*Primary Examiner*—Stephen C. Elmore
*Assistant Examiner*—Daniel Kim
(74) *Attorney, Agent, or Firm*—Dillon & Yudell LLP

(57) ABSTRACT

A first array of disk drives overlaps with a second array of disk drives in a Redundant Array of Inexpensive Drives (RAID) system, in which the first and second arrays share at least one disk drive. A first stripe of data from a first client is stored in the first array, and a second stripe of data from a second client is stored in the second array. The shared disk drives are less than the number of drives needed to reconstruct a full stripe. Thus, in the event of a drive failure in the first array, the first client can reconstruct the first data stripe, but is never able to reconstruct the second stripe. Likewise, in the event of a drive failure in the second array, the second client can reconstruct the second data stripe, but is never able to reconstruct the first stripe.

7 Claims, 10 Drawing Sheets

[Figure 1]
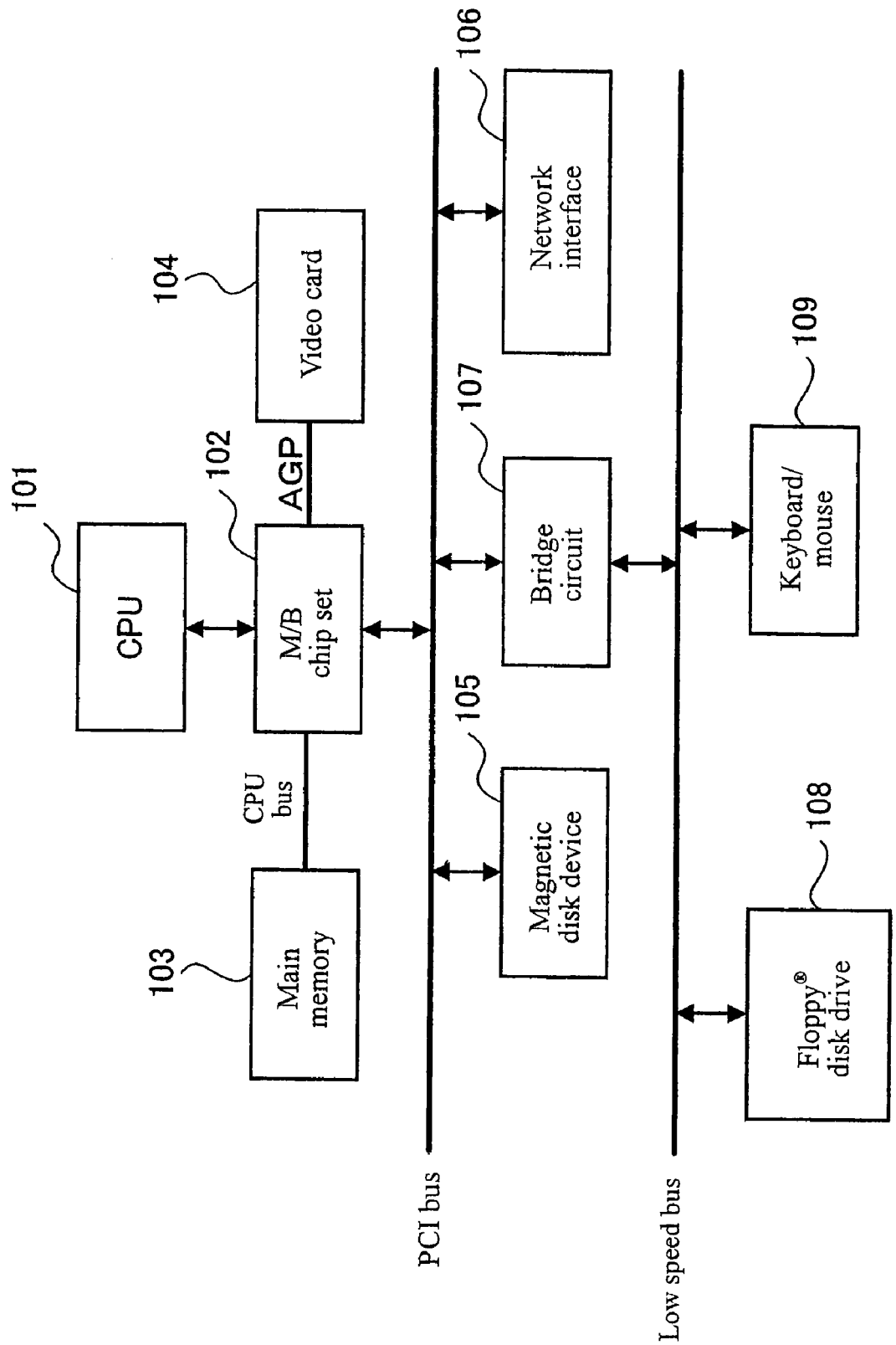

[Figure 2]
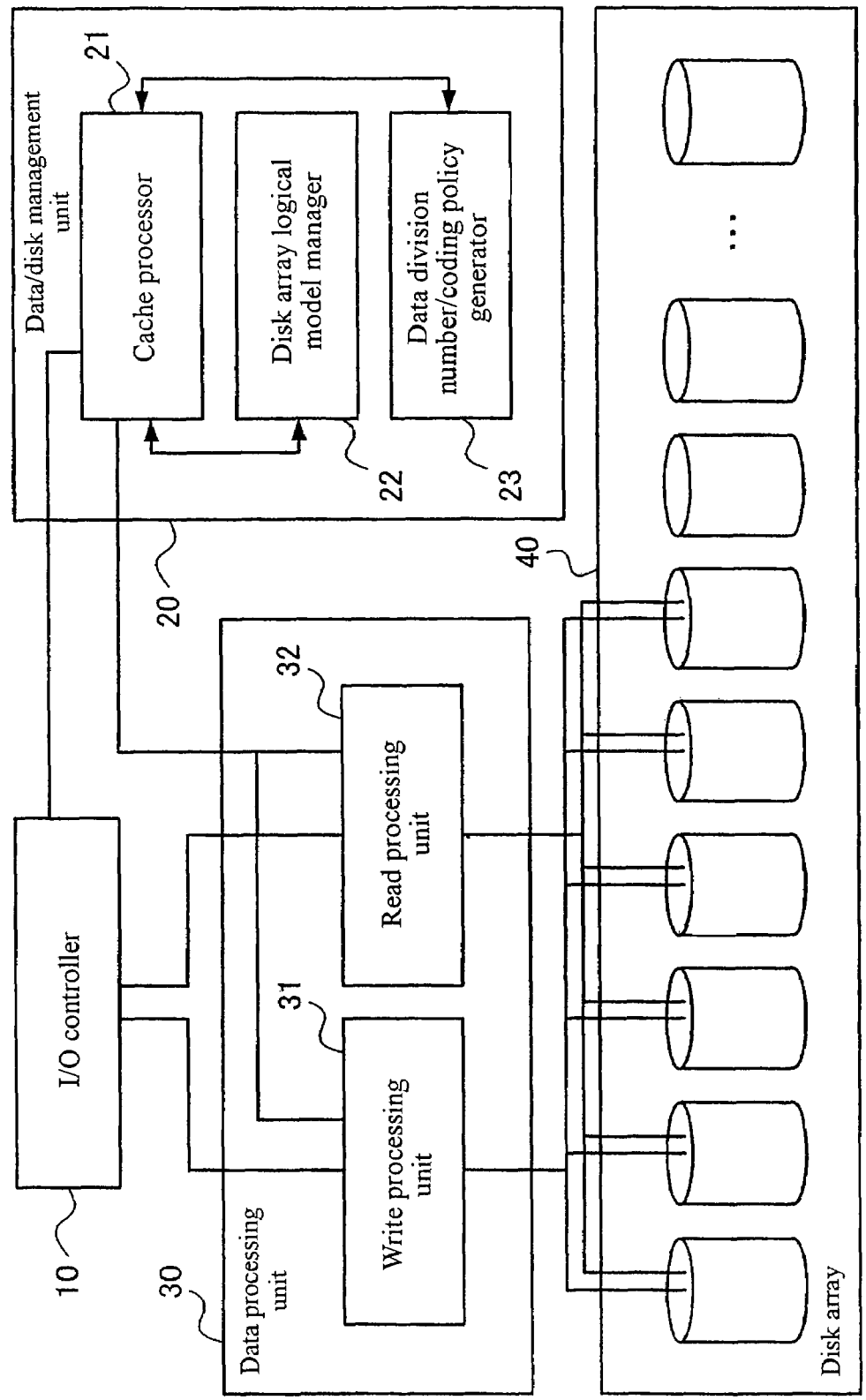

[Figure 3]
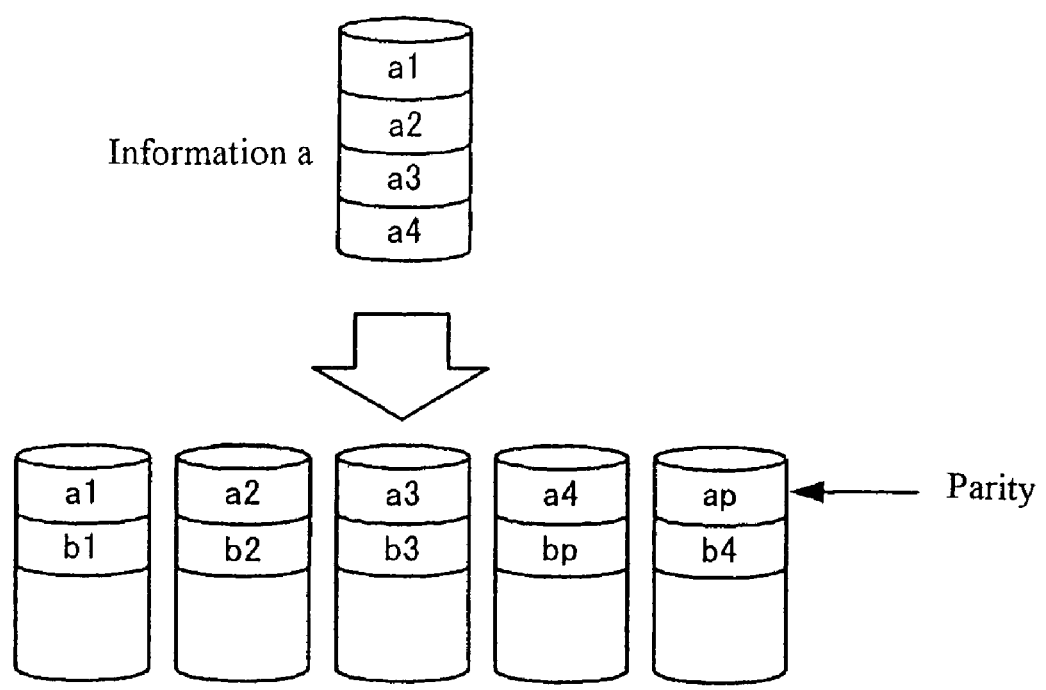

[Figure 4]
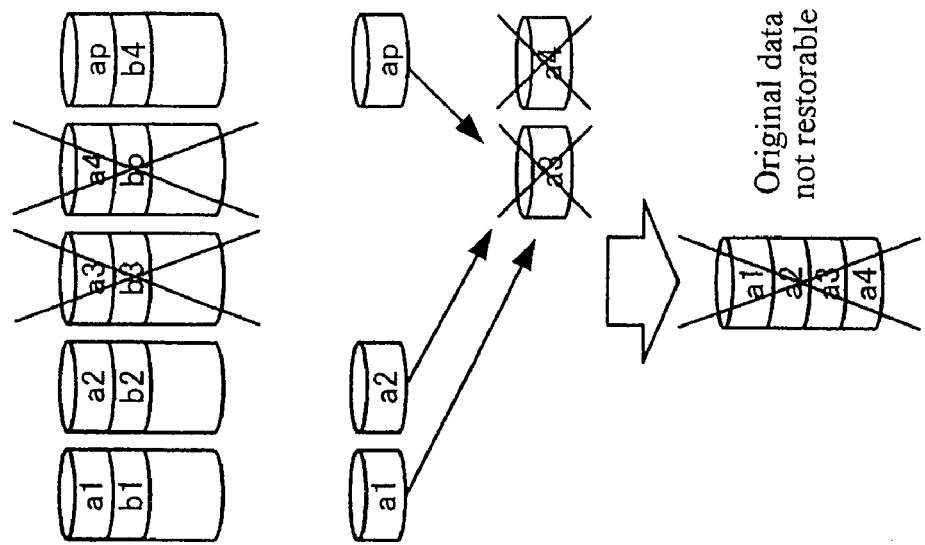
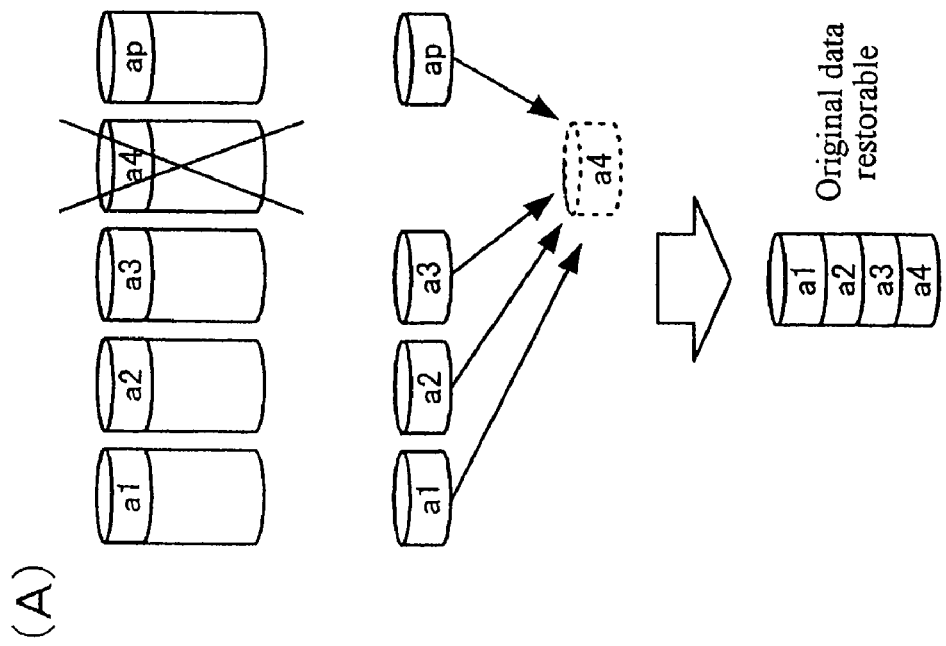

[Figure 5]
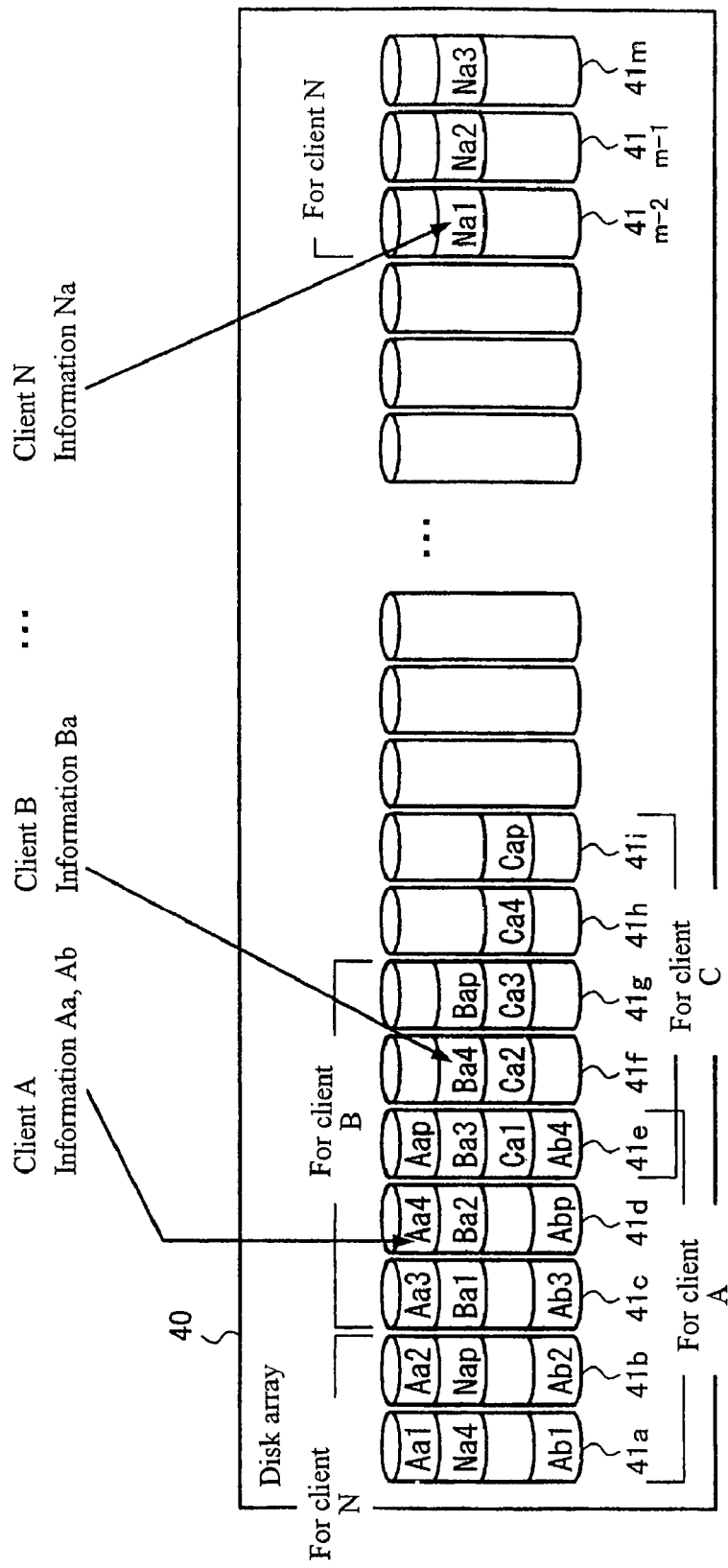

[Figure 6]
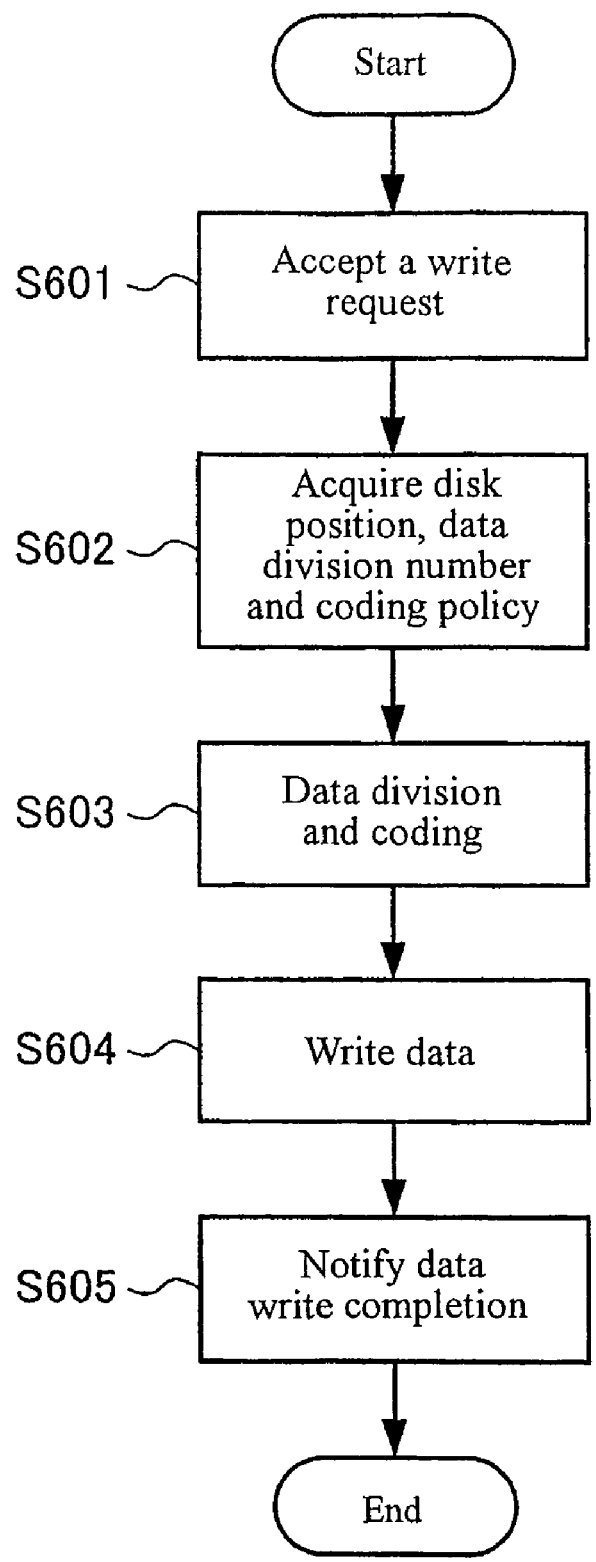

[Figure 7]
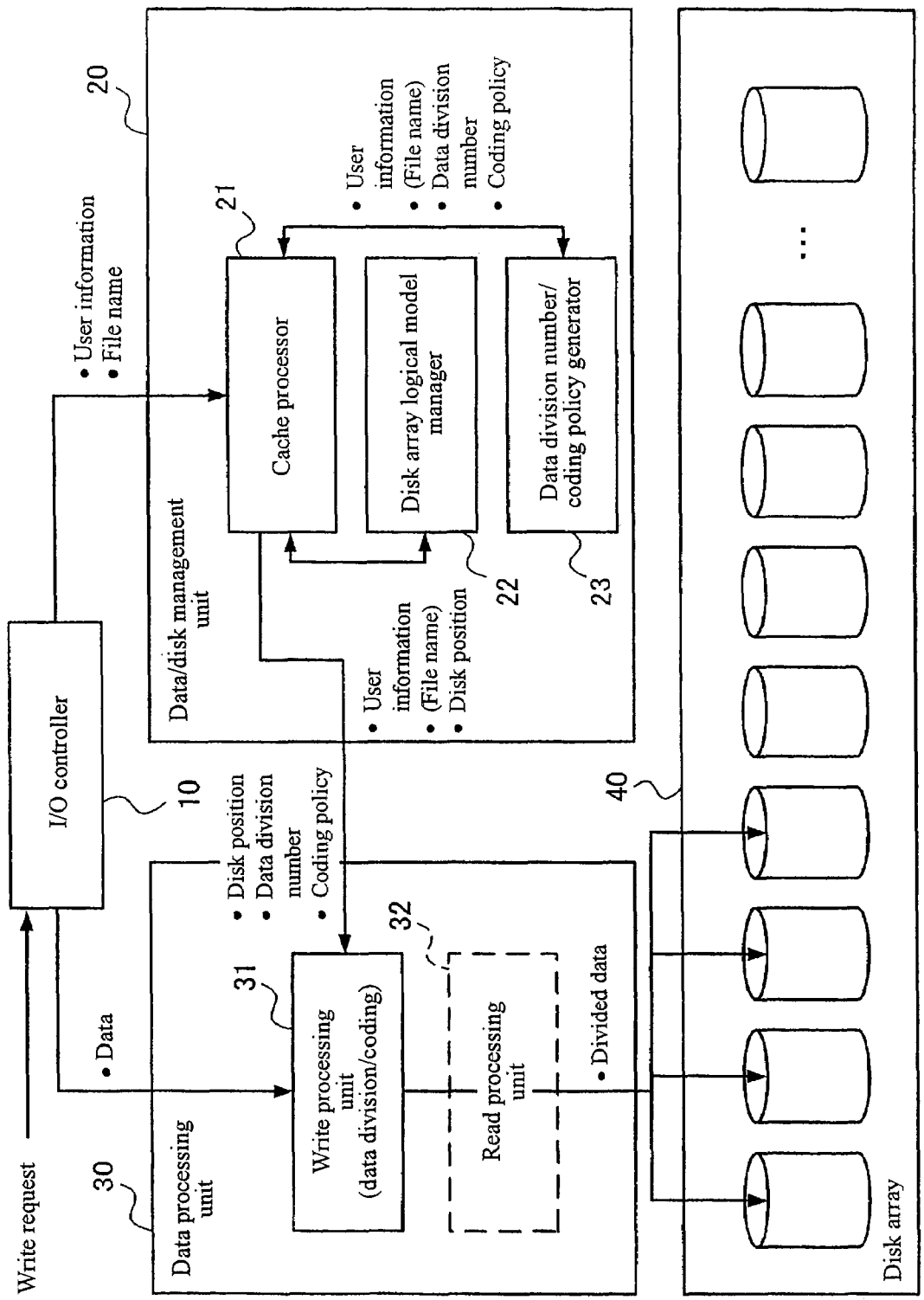

[Figure 8]
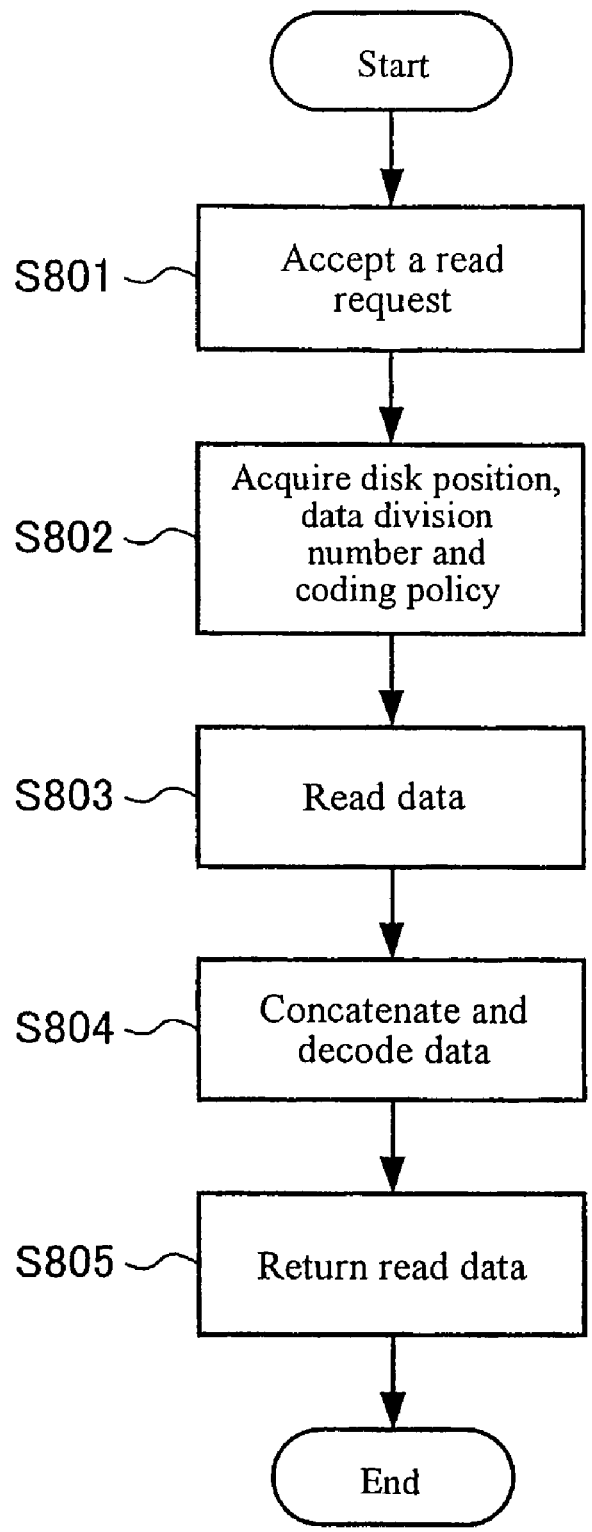

[Figure 9]
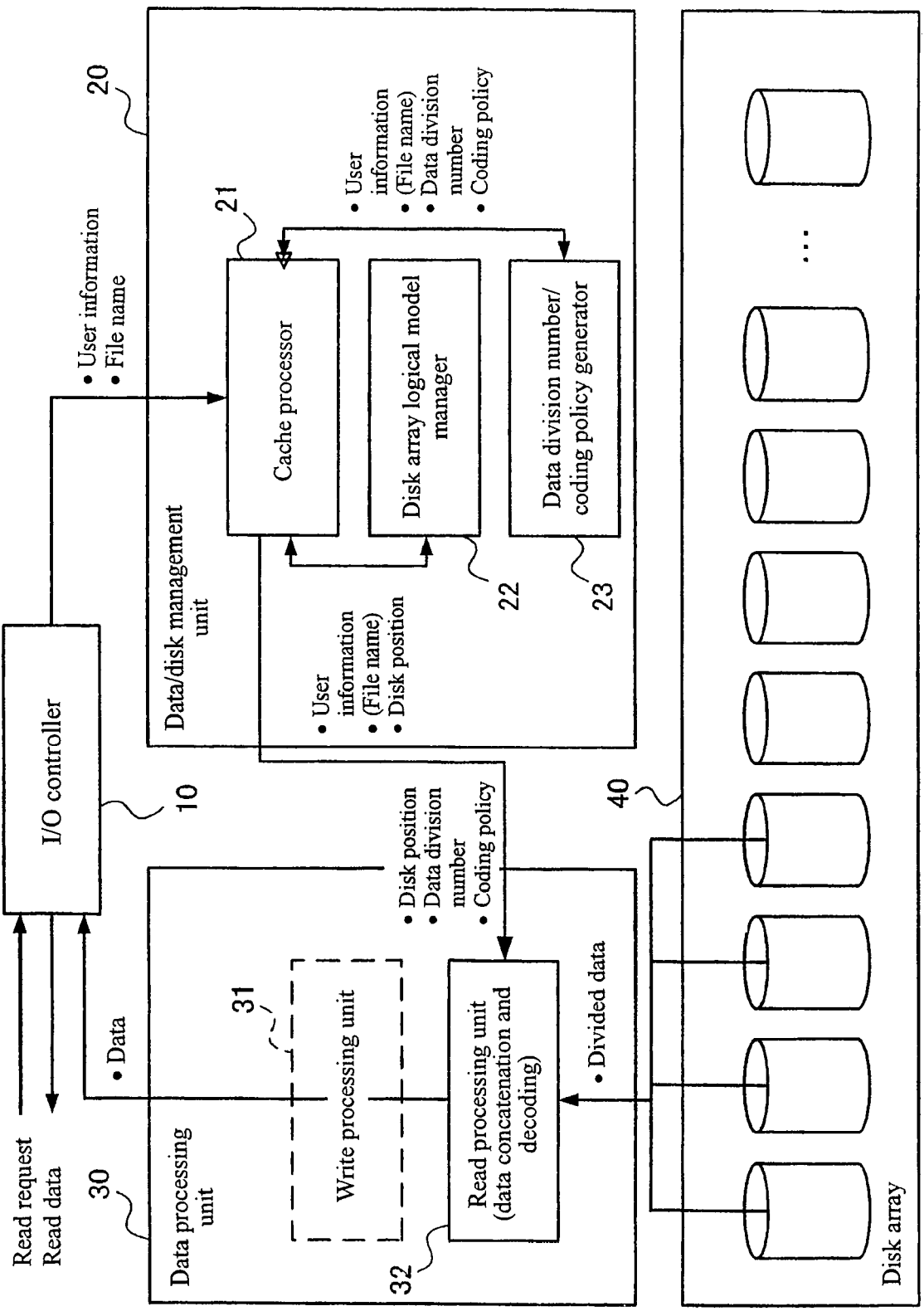

[Figure 10]
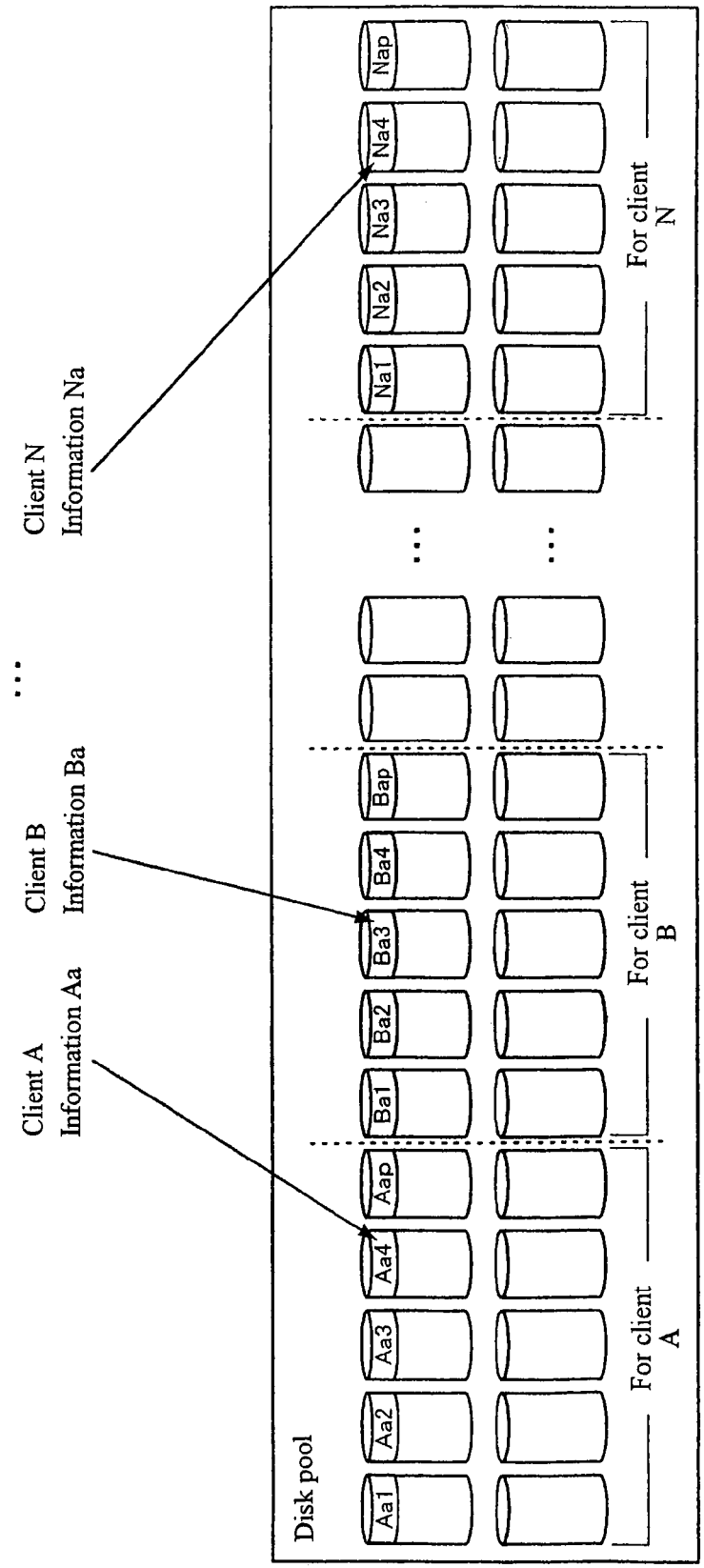

RAID OVERLAPPING

PRIORITY CLAIM

This application claims priority of Japanese Patent Application No. 2003-179042, filed on Jun. 24, 2003, and entitled, "Server, Computer Apparatus, Data Processing Method and Program."

BACKGROUND OF THE INVENTION

1. Technical Field

The present invention relates to a technique for sharing a computer resource provided on a network among plural users, and more particularly to data protection when a storage device is shared.

2. Description of Related Art

Nowadays, a variety of services have been made available, including a hosting service for lending computer resources (server, storage device, circuit, application and so on) provided on a network, using the network such as the Internet that is widely spread and a utility computing service in which computer resources can be purchased by a necessary amount, as needed. These services reduce a load on the economy and human resources for maintaining the computer resources from the viewpoint of the user, and are meaningful for the company, because the company is relieved of the load or waste by outsourcing them.

As one of the hosting/utility computing services, there is a service for providing a data storage area of the storage device to the user. In this service, it is important to assure the reliability (fault or failure counter plan) and safety (measure to prevent leakage of information to other companies) of information recorded in the storage device. As a failure counter plan, there is a technique for recording the record information with redundancy, including the RAID (Redundant Arrays of Independent Disks).

On the other hand, the existent schemes for preventing leakage of data include the encryption of recorded data and the access control (authentication). Moreover, to be safer, there is a method for physically separating the recording medium for writing information for each user. For example, information of each user is recorded on different magnetic disk assigned to each user, when the storage device is a magnetic disk device.

FIG. 10 is a diagram showing a hosting server in which physically different magnetic disks are assigned to plural companies.

As shown in FIG. 10, the hosting server has a disk pool composed of plural magnetic disk devices. Data from different companies are stored in different magnetic disks, such that information Aa of client A is stored in magnetic disks for client A, information Ba of client B in magnetic disks for client B, and so on. In FIG. 10, for example, information Aa of client A is divided into four blocks of data Aa1, Aa2, Aa3 and Aa4, with the parity data added, and are stored in five magnetic disks.

In the conventional hosting service, various methods for assuring the safety of recorded data are taken. However, in the case where the recording medium is shared among plural users to permit only the maintenance under access control, all the information for the users sharing the recording medium may be accessed, if the access control is broken.

Also, when the recording media for recording data for each user are physically separated, it is not possible for plural users to share individual recording medium. That is, the recording medium assigned to a certain user is only usable to record the information of the user, even if a large empty area remains. Therefore, the recording medium has a lower utilization efficiency.

Thus, it is an object of the invention to assure the safety of recorded data while sharing the recording medium among plural users, and improve the utilization efficiency of the recording medium.

SUMMARY OF THE INVENTION

In order to achieve the above object, the present invention is implemented as a server with the following constitution. That is, the server provides a storage area of a storage device that is a computer resource via a network to the client, comprising a storage device group composed of plural storage devices, and a data processing unit, in response to a write request from the client, for dividing the write data included in the write request so that concatenating the divided data may restore the original information, and for writing the data so that the plural storage devices storing the write data of each client may partly overlap with each other.

Also, this invention is implemented as a computer apparatus with the following constitution. That is, the computer apparatus comprises a storage device group composed of plural storage devices, and a data processing unit for reading or writing data from or into the storage devices. And this data processing unit, when writing data into the storage devices, divides each data file into plural pieces of divided data so that concatenating the divided data may restore the original information, and writes the data so that storage devices storing the divided data of a certain data file and storage devices storing the divided data of another data file may partly overlap.

Moreover, this invention is implemented as a computer apparatus comprising a disk array composed of plural magnetic disk devices, and a data processing unit for reading or writing data from or into the disk array. In this computer apparatus, the disk array stores plural divided data processed by dividing each data file so that concatenating the divided data may restore the original information, in such a way that magnetic disk devices storing a certain data file and magnetic disk devices storing another data file may partly overlap.

Also, in order to achieve the above object, another embodiment of the present invention is implemented as a data processing method for enabling a computer to write data received from a certain client via a network into a storage device group composed of plural storage devices as configured in the following way. This data processing method comprises a first step of, in response to a write request from the client, dividing the write data included in the write request into plural divided data so that concatenating the divided data may restore the original information, and a second step of storing the divided data into the storage device group so that the plural storage devices storing the write data of each client may partly overlap with each other.

Further, in the server, the computer apparatus and the data processing method according to the invention, when the write data (data file) is divided, there is a redundancy to enable restoration of the original data file even if part of the divided data is lost. In this case, the data is written so that the number of storage devices overlapping storage devices (magnetic disk devices) storing another write data (data file) may be insufficient to restore the original data file.

Preferably, when the write data (data file) is divided, the division number or the size of divided data (data length, block length) is changed for each client making the write request, each data file or each divided data. Furthermore, the divided data is encrypted or scrambled for writing. In this way, the user who is accessible to a certain data file is more securely prevented from acquiring another data file that is not permitted to access, whereby the data file stored in the storage device has higher safety.

Moreover, this invention is implemented as a program for controlling a computer to perform various functions, or the processes corresponding to steps in the data processing method. This program may be stored and distributed in a magnetic disk, an optical disk, a semiconductor memory or other storage media, or distributed via a network.

BRIEF DESCRIPTION OF THE DRAWINGS

FIG. 1 is a typical block diagram showing an example of the hardware configuration of a computer apparatus for implementing a hosting server for use in an embodiment of the invention;

FIG. 2 is a diagram showing the functional configuration of a hosting server implemented by the computer apparatus according to the embodiment as shown in FIG. 1;

FIG. 3 is a diagram showing a method for dividing data into plural blocks and writing divided blocks of data into plural disks that are distributed, using a RAID5;

FIG. 4 is a view for explaining whether or not to restore the original data when data is written using the RAID5;

FIG. 5 is a diagram showing a method for writing data into a disk array according to the embodiment;

FIG. 6 is a flowchart for explaining the operation of a data write process by the hosting server according to the embodiment;

FIG. 7 is a diagram showing the data flow in writing data;

FIG. 8 is a flowchart for explaining the operation of a data read process by the hosting server according to the embodiment;

FIG. 9 is a diagram showing the data flow in reading data; and

FIG. 10 is a diagram showing the hosting server in which physically different magnetic disks are assigned to plural companies.

DETAILED DESCRIPTION OF THE PREFERRED EMBODIMENT

The preferred embodiments of the present invention will be described below in detail with reference to the accompanying drawings.

FIG. 1 is a block diagram showing an example of a hardware configuration of a computer apparatus for implementing a hosting server for use in an embodiment of the invention.

The computer apparatus as shown in FIG. 1 comprises a CPU (Central Processing Unit) 101 that is operation means, a main memory 103 connected via an M/B (Mother Board) chip set 102 and a CPU bus to the CPU 101, a video card 104 connected via the M/B chip set 102 and an AGP (Accelerated Graphics Port) to the CPU 101, a magnetic disk device (Hard Disk Drive—HDD) 105 connected via a PCI (Peripheral Component Interconnect) bus to the M/B chip set 102, a network interface 106, and a floppy disk drive 108 and a keyboard/mouse 109 connected via the PCI bus, a bridge circuit 107 and a low speed bus such as an ISA (Industry Standard Architecture) bus to the M/B chip set 102.

FIG. 1 only exemplifies the hardware configuration of the computer apparatus for implementing this embodiment, but various other configurations may be taken, as far as this embodiment is applicable. For example, the video card 104 is not provided, but a video memory may be only mounted to process the image data in the CPU 101. As an external storage device, a CD-R (Compact Disc Recordable) or DVD (Digital Versatile Disc) drive may be provided via an interface such as ATA (AT Attachment) or SCSI (Small Computer System Interface).

In this embodiment, the magnetic disk device 105 is employed as the storage device storing the information of the user. Accordingly, plural magnetic disk devices 105 are prepared to compose a disk array.

FIG. 2 is a diagram showing the functional configuration of the hosting server implemented by the computer apparatus according to the embodiment as shown in FIG. 1.

Referring to FIG. 2, the hosting server of this embodiment comprises a disk array 40 composed of plural disks (corresponding to the magnetic disk devices 105 in FIG. 1), an I/O (Input/Output) controller 10 for transmitting a request or receiving a response to or from the client (service user), a data/disk management unit 20 for managing various kinds of data or the disk information, and a data processing unit 30 for reading or writing data from or into the disk.

Of the components as shown in FIG. 2, the I/O controller 10 and the data processing unit 30 are software blocks implemented by the CPU 101 that is controlled by the program as shown in FIG. 1. Also, the data/disk management unit 20 consists of the CPU 101 controlled by the program and storage means such as the main memory 103, the magnetic disk device 105 and a cache memory provided in the CPU 101. The program for controlling the CPU 101 to perform the functions is stored and distributed in a magnetic disk, an optical disk, a semiconductor memory or other recording media, or may be distributed via the network.

The I/O controller 10 accepts a read or write request from the client via the network interface 106 of FIG. 1, for example, and issues an instruction to the data/disk management unit 20 and the data processing unit 30. And the I/O controller 10 receives a completion notice of the write process or the read data from the data processing unit 30, and returns a response to the prior request via the network interface 106 to the client. A specific operation of the data writing or reading process will be described later.

The data/disk management unit 20 comprises a cache processor 21, a disk array logical model manager 22, and a data division number/coding policy generator 23, as shown in FIG. 2.

The cache processor 21, in response to an instruction from the I/O controller 10, collects the information necessary for operating the data processing unit 30 and passes it to the data processing unit. Also, the information acquired through a previous process is cached in the cache memory of the CPU 101 or the main memory 103. The cache processor 21 makes the processing faster when data is written or read for the same client.

The disk array logical model manager 22 creates and manages a logical model (disk array logical model) for managing at which position the data of each client is recorded in all the disks composing the disk array 40. The created disk array logical model is stored in a predetermined area of the main memory 103 or the magnetic disk 105.

The data division number/coding policy generator 23 defines, for each client, the data division number indicating the number of dividing data in writing data and the coding policy indicating the coding method (including a coding function or parameters) for encoding the data. Herein, the data division number means the number of dividing data to be distributed and written into plural disks of the disk array 40. For example, write data is divided into four blocks, with the parity data added, and are distributed and written into five disks. The generated data division number and coding policy are stored in a predetermined area of the main memory 103 or the magnetic disk device 105.

The data processing unit 30 comprises a write processing unit 31 for writing data and a read processing unit 32 for reading data, as shown in FIG. 2.

The write processing unit 31 acquires the disk position, data division number and coding policy from the data/disk management unit 20, and divides the write data received from the I/O controller 10, based on these pieces of information, whereby the divided data is encoded and written into a desired disk of the disk array 40.

The read processing unit 32 acquires the disk position, data division number and coding policy from the data/disk management unit 20, and reads the desired data from the disk array 40, based on these pieces of information, whereby the read data is concatenated, decoded and passed to the I/O controller 10.

The disk array 40 is composed of plural disks, as previously described. And the client data is distributed and recorded into plural disks. In this case, the distributed and recorded data is totally or partly collected to restore the original data.

FIGS. 3 and 4 are diagrams showing a method for dividing data into plural blocks and writing divided blocks of data into plural disks that are distributed, using the RAID 5.

In the RAID 5, data is divided into block units, and recorded in plural disks that are distributed, with the parity data recorded in another disk, as shown in FIG. 3. In this case, if one disk fails, the original data is restored from the divided data of block units on the remaining disk, as shown in FIG. 4A. On the other hand, when two or more disks are not accessible, the original data is not restored correctly, as shown in FIG. 4B.

Herein, the method for writing data into the disk array 40 according to the embodiment will be described below in detail.

To generalize the division and coding in writing data into the disk array 40, it is supposed that the information of k bits is encoded with code length n and error correction capability t, and data is written into n disks that are distributed. That is, when the divided data is unreadable from t disks among n disks, the data written in the disk array 40 has a redundancy that the original data can be restored from the remaining divided data of n–t bits. In this case, the disk position of write destination is controlled so that the number of disks shared with another client may be equal to or less than n–(t+1) where the data of certain client is written into n disks in this embodiment.

In this way, if another client takes out the data of another client from the disk shared to acquire the data of n–(t+1) bits, the original data is not resynthesized correctly because the error correction capability is t bits. Of course, it does not matter that the information amount recordable in one disk is one bit or more. The coding systems with error correction capability may include, for example, a cyclic code, a BCH code and an RS code.

In the case where data is recorded using the RAID 5, as shown in FIGS. 3 and 4, if there are two or more inaccessible disks, the original data is not restored correctly, as described above. Thus, two or more disks without overlapping write data are provided in writing data of each client.

FIG. 5 is a diagram showing a method for writing data into the disk array 40 according to the embodiment.

In FIG. 5, among m disks (41a to 41m) composing the disk array 40, the disks 41a to 41e are assigned to recording the information of client A (Aa and Ab). Also, the disks 41c to 41g shifted by two to the right are assigned to recording the information (Ba) of client B. Likewise, the disks 41e to 41i are assigned to recording the information (Ca) of client C, and the disks 41m-2 to 41m and the disks 41a, 41b are assigned to recording the information (Na) of client N.

For example, in writing the write data sent from the client A, the data is divided into four blocks (Aa1 to Aa4, Ab1 to Ab4) by the write processing unit 31 in the data processing unit 30, with the parity data (Aap, Abp) added, and written into five disks 41a to 41e. It is possible to arbitrarily decide in which disk the divided data and parity data are stored among assigned disks. In an example of FIG. 5, the parity data Aap added to the information Aa of client A is written in the disk 41e, while the parity data Abp added to the information Ab is written in the disk 41d.

If the data of each client is written in the above way, the original data of another client is prevented from being restored correctly, even though a certain client can access the divided data written by another client by breaching the access control.

By the way, in the case where the information is written into plural disks that are distributed, for example, if information of one bit is described in each of n disks using the code (n, k, t), the original data is restored by retrieving all the data with a computation amount of $O(2^{t+1})$, as far as the (n, k, t) coding system is known. As a measure for avoiding such an incorrect read, the method for distributing and writing data is changed for each client, or the disk utilization efficiency is lowered to have a smaller number of disks that are shared among plural clients. To change the data writing method involve changing the number of dividing the data for each client, encrypting and scrambling the divided data, changing the block length (data length) of divided data for each client, and other various methods.

The operation of data processing in the hosting server according to the embodiment will be described below.

FIG. 6 is a flowchart for explaining the operation of the data write process by the hosting server according to the embodiment, and FIG. 7 is a diagram showing the data flow in writing data.

When a request for writing data from a certain client is delivered to the hosting server, the client information for specifying the client and a file name of the write data are extracted from the write request by the I/O controller 10, and sent to the data/disk manager 20. Also, the write data contained in the write request is sent to the data processing unit 30 (step 601).

If the data/disk management unit 20 accepts the client information and the file name, the cache processor 21 acquires the disk position, data division number and coding policy for the client that are specified based on those pieces of information (step 602). More specifically, first of all, it is checked whether or not those pieces of information are cached in the cache processor 21 itself. If not cached, an inquiry about those pieces of information is made to the disk array logical model manager 22 and the data division number/coding policy generator 23 (see FIG. 7).

When the disk array logical model has information of disk position for the client, the disk array logical manager 22 passes its information to the cache processor 21. On the other hand, when the disk array logical model does not have the desired information, the disk array logical model manager 22 defines a new disk position, and adds it to the disk array logical model, as well as passing it to the cache processor 21.

Also, when the data division number/coding policy generator 23 holds the data division number and the coding policy for writing data of the client, the data division number/coding policy generator 23 passes its information to the cache processor 21. On the other hand, when the desired data division number and coding policy are not held, the data division number/coding policy generator 23 defines and holds a new data division number and coding policy, and passes them to the cache processor 21.

The cache processor 21 acquires the cache data, or desired information of disk position, data division number and coding policy corresponding to the write request from the disk array logical model manager 22 and the data division number/coding policy generator 23, and then passes these pieces of information to the data processing unit 30 (see FIG. 7). When these pieces of information are acquired from the disk array logical model manager 22 and the data division number/coding policy generator 23, the cache processor 21 newly caches the acquired information. When the cache capacity of the cache processor 21 is full, no hit cache data is deleted in the order from the oldest data, whereby the empty capacity is kept and the acquired information is cached.

If the information of disk position, data division number and coding policy are obtained in the above way, the write processing unit 31 for the data processing unit 30 divides and encodes the write data, using these pieces of information (step 603), and write data into the disk array 40 (step 604). And after the writing of data is ended, a write completion notice is issued from the write processing unit 31, and returned via the I/O controller 10 to the client making the write request (step 605).

FIG. 8 is a flowchart for explaining the operation of a data read process by the hosting server according to the embodiment, and FIG. 9 is a diagram showing the data flow in reading data.

When a request for reading data from a certain client is delivered to the hosting server, the client information for specifying the client and a file name of the read data are extracted from the read request by the I/O controller 10, and sent to the data/disk management unit 20 (step 801).

If the data/disk management unit 20 accepts the client information and the file name, the cache processor 21 acquires the disk position of the client, the data division number and the coding policy that are specified based on these pieces of information (step 802). The specific operation of acquiring these pieces of information is the same as described in the data write process (see FIG. 9).

If the information of disk position, data division number and coding policy are obtained in the above way, the read processing unit 32 for the data processing unit 30 reads data from the disk array 40, using these pieces of information (step 803), and the read data is concatenated and decoded (step 804). And the decoded read data is sent from the read processing unit 32 to the I/O controller 10, and returned to the client having made the read request (step 805).

The hosting server of this embodiment provides the computer resources to the client via the network, but may be applied to various conventional services in its service form. More specifically, it may be applied to the on-demand disk providing service, for example.

For most companies, if the IT resources such as hardware resources of the computer are possessed and managed within its own company, there is a great load on the economy and human resources. Therefore, for the management of such resources, it is common to ask other companies for outsourcing or hosting. Thus, for such companies, the hosting server of this embodiment is employed for the on-demand disk providing service to provide the storage area of disk as the storage location of data, as needed.

In this case, in providing the disk to plural companies, a huge disk pool (disk array 40) is prepared for each company to designate a disk group accessible in response to a request from each company. One data file of the company is distributed and written into the designated disk group, and the original data file is restored by reintegrating the disk group. A part of the disk group assigned to one company is shared with other companies, but the number of shared disks is limited. Thereby, even if a certain company gaining access to the disk assigned to its company can access a part of the data file distributed for another company, the information of the data file is not completely resynthesized. On the other hand, for the hosting server, individual disks in the disk pool are shared among plural companies, whereby the storage area of the disk is provided to more companies to have the higher utilization ratio than when individual disks are assigned to each company.

Also, another application example of the hosting server according to this embodiment is a data temporary saving service. When the data reduction or system change/management or integration or disintegration is made within the company, it is required to temporarily save or back up the data. In this case, for the reason of assuring higher safety against data loss or lack of resources (storage capacity of disk) in the company computer system, it is considered that the company data is temporarily saved in the huge disk pool in the outside data center. When plural companies employ this service, the hosting server of this embodiment is applied to prevent leakage of the information of each company within the data center to other companies.

In the hosting server of this embodiment, the same disk is physically shared among plural companies. However, even though a certain company can read the divided data of another company written on the accessible disk, the original data is not restored from the divided data, and the information is not leaked. Therefore, it is allowed to share the disk among plural companies while keeping the safety of information temporarily saved, whereby the utilization efficiency of resources in the data center is enhanced.

In this embodiment, the hosting server has the disk array composed of plural magnetic disk devices as the storage device. However, this embodiment may be also applicable to the storage device using various storage media other than the magnetic disk device in the server or computer apparatus having the storage device group composed of plural storage units. Also, in this embodiment, the data to be stored may be not only the write data in response to a write request from the client but also plural data files required to regulate the user accessible to each data file. That is, each data file is stored in plural storage devices distributed so that the storage devices storing individual data files may partly overlap with each other, whereby the access control is more reliable, and the safety of stored data file is assured.

As described above, with this invention, while the recording medium is shared among plural users, the safety of recorded data is assured, and the utilization efficiency of the recording medium is enhanced.

What is claimed is:

1. A disk storage server for providing a storage area of a storage device to a client, the disk storage server comprising:

a storage device group composed of multiple storage devices, wherein the multiple storage devices are divided into a first array that is assigned to a first client and a second array that is assigned to a second client; and a data processing unit for dividing a write data in a write request so that concatenating the divided data is able to restore the original information, and for writing the data so that said plural storage devices storing the write data of each client partly overlap with each other, and wherein a quantity of shared storage devices, that are shared between the first and second clients, is equal to n−(t+1), wherein n is a total number of storage devices assigned to both the first and second clients, and wherein t is a total number of storage devices that can fail within a storage device array while still allowing data in the storage device array to be restored, wherein said data processing unit changes a method for dividing the write data for each client.

2. The disk storage server according to claim 1, wherein said data processing unit divides the write data from the first client with a redundancy to enable restoration of the original write data from the first client even if part of said original write data is lost, and wherein the data processing unit writes the data so that overlapping storage devices storing a write data of a second client are insufficient to restore the write data of said first client.

3. A computer apparatus comprising:

a storage device group composed of multiple storage devices, wherein the multiple storage devices are divided into a first array that is assigned to a first client and a second array that is assigned to a second client; and a data processing unit for reading or writing data from or into said storage devices, wherein said data processing unit, when writing data into said storage devices, divides each data file into multiple pieces of divided data so that concatenating the divided data may restore the original information, and wherein the data processing unit writes the data so that storage devices storing the divided data of a certain data file and storage devices storing the divided data of another data file partly overlap, and wherein a quantity of shared storage devices, that are shared between the first and second clients, is equal to n−(t+1), wherein n is a total number of storage devices assigned to both the first and second clients, and wherein t is a total number of storage devices that can fail within a storage device array while still allowing data in the storage device array to be restored, wherein said data processing unit changes the number of pieces of divided data for each data file.

4. The computer apparatus according to claim 3, wherein said data processing unit divides the certain data file with a redundancy to enable restoration of the original data file even if part of said certain data file is lost, and wherein said data processing unit writes the data so that the number of storage devices overlapping storage devices storing another data file are insufficient to restore said certain data file.

5. The computer apparatus according to claim 3, wherein said data processing unit encrypts the divided data obtained by dividing said data file to write the data.

6. A computer apparatus comprising:

a storage device group composed of multiple storage devices, wherein the multiple storage devices are divided into a first array that is assigned to a first client and a second array that is assigned to a second client; and a data processing unit for reading or writing data from or into said storage devices, wherein said data processing unit, when writing data into said storage devices, divides each data file into multiple pieces of divided data so that concatenating the divided data may restore the original information, and wherein the data processing unit writes the data so that storage devices storing the divided data of a certain data file and storage devices storing the divided data of another data file partly overlap, and wherein a quantity of shared storage devices, that are shared between the first and second clients, is equal to n−(t+1), wherein n is a total number of storage devices assigned to both the first and second clients, and wherein t is a total number of storage devices that can fail within a storage device array while still allowing data in the storage device array to be restored, wherein said data processing unit changes the size of divided data for each data file or each divided data.

7. A computer apparatus according to claim 6, wherein the multiple storage devices are magnetic disk devices.

* * * * *